US009088480B2

(12) United States Patent
Burch et al.

(10) Patent No.: US 9,088,480 B2
(45) Date of Patent: Jul. 21, 2015

(54) TECHNIQUES FOR AUDITING AND CONTROLLING NETWORK SERVICES

(71) Applicant: Novell, Inc., Provo, UT (US)

(72) Inventors: Lloyd Leon Burch, Payson, UT (US);
Jeremy Ray Brown, Bluffdale, UT (US); Jason Allen Sabin, Lehi, UT (US); Nathaniel Brent Kranendonk, Springville, UT (US); Kal A. Larsen, Springville, UT (US); Michael Fairbanks, Lindon, UT (US); Michael John Jorgensen, Mapleton, UT (US); Thomas Larry Biggs, Payson, UT (US)

(73) Assignee: Novell, Inc., Provo, UT (US)

(*) Notice: Subject to any disclaimer, the term of this patent is extended or adjusted under 35 U.S.C. 154(b) by 0 days.

(21) Appl. No.: 14/076,895

(22) Filed: Nov. 11, 2013

(65) Prior Publication Data

US 2014/0164606 A1 Jun. 12, 2014

Related U.S. Application Data

(63) Continuation of application No. 13/090,949, filed on Apr. 20, 2011, now Pat. No. 8,583,788.

(51) Int. Cl.
G06F 15/16 (2006.01)
H04L 12/26 (2006.01)
H04L 29/06 (2006.01)

(52) U.S. Cl.
CPC ............ H04L 43/04 (2013.01); H04L 63/1408 (2013.01)

(58) Field of Classification Search
None
See application file for complete search history.

(56) References Cited

U.S. PATENT DOCUMENTS

| 5,748,890 | A | 5/1998 | Goldberg et al. |
| 5,983,350 | A * | 11/1999 | Minear et al. ................... 726/11 |
| 6,219,706 | B1 | 4/2001 | Fan et al. |
| 7,127,743 | B1 | 10/2006 | Khanolkar et al. |
| 7,404,205 | B2 | 7/2008 | Scoredos et al. |
| 7,668,145 | B2 | 2/2010 | Le et al. |
| 7,765,597 | B2 | 7/2010 | Sima et al. |
| 8,583,788 | B2 | 11/2013 | Burch et al. |
| 2006/0233166 | A1 | 10/2006 | Bou-diab et al. |
| 2007/0124797 | A1 | 5/2007 | Gupta et al. |
| 2008/0046886 | A1 | 2/2008 | Brown et al. |
| 2009/0077546 | A1 | 3/2009 | Huang et al. |
| 2010/0017536 | A1 | 1/2010 | Colvig et al. |
| 2010/0179982 | A1 | 7/2010 | Colon |
| 2012/0271936 | A1 | 10/2012 | Burch et al. |

* cited by examiner

Primary Examiner — Thomas Dailey
(74) Attorney, Agent, or Firm — Schwegman Lundberg & Woessner, P.A.

(57) ABSTRACT

Techniques for auditing and controlling network services are provided. A proxy is interposed between a principal and a network service. Interactions between the principal and the service pass through the proxy. The proxy selectively raises events and evaluates policy based on the interactions for purposes of auditing and controlling the network service.

1 Claim, 5 Drawing Sheets

TECHNIQUES FOR AUDITING AND CONTROLLING NETWORK SERVICES

This application is a continuation of U.S. patent application Ser. No. 13/090,949, filed on Apr. 20, 2011, now issued as U.S. Pat. No. 8,583,788, which is incorporated herein by reference in its entirety.

BACKGROUND

Cloud computing is rapidly changing the Internet into a collection of clouds, which provide a variety of computing resources, storage resources, and, in the future, a variety of resources that are currently unimagined.

However, enterprises still face many issues when migrating services to the cloud environment. For example, services may require logging and auditing such that when the enterprise outsources a service to a cloud, control over logging and auditing for that service can be potentially compromised.

Additionally, some services that are controlled within an enterprise environment may not need logging or auditing because their native environment is controllable within the enterprise. But, these same services may require logging and auditing capabilities when outsourced to a cloud because the cloud environment is not controlled by the enterprise. The problem with this is that the services migrated to the cloud may not be written to provide logging or auditing features, such that these services have to be rewritten or substantially modified before they can be migrated to the cloud. So, when a service moves from an enterprise-controlled hardware environment to a cloud environment the traditional means of controlling the logging and auditing of the service are lost.

Also, one function of an "auditing system" that is different than a "logging system" is the ability to not allow access if the system cannot provide a completed audit trail. This also becomes difficult to do in a cloud environment. In fact, such features may not even be a native capability of the service being processed in the cloud. Moreover, because of the great exposure that a service has in the cloud, a "guaranteed" audit may be a requirement by an enterprise before that service is migrated to the cloud. Without a guaranteed audit, a cloud hacker may disable an audit system and allow the service to run without any audit trail. When this happens, the owner of the service may become totally blind on how the application is being used within the cloud.

Still another issue for services that migrate to a cloud environment is that as the services move out of the control of the local physical hardware there is lack of tools to make an effective "Cause and Effect" decision with respect to the executing services. This is so, because an enterprise administrator no longer has access to the hardware such that the ability to track the effect of an inbound event is significantly diminished. Thus, the administrator has a hard time knowing how to manage the services because of a lack of knowledge about network traffic and response times with respect to the administrator's cloud services. So, the administrator cannot dynamically control an operation or a service when it becomes too costly for the enterprise or too slow for the user.

SUMMARY

Various embodiments of the invention provide techniques for auditing and controlling network services. Specifically, a method for auditing a network service is provided.

More particularly, a communication that is directed to or is emanating from a network service is trapped. The network service is accessible within a first processing environment. Next, an audit event is generated for the communication and a policy is evaluated based on the audit event to decide whether to permit the communication to be relayed: to the network service or to a principal with which the network service is interacting. The principal is associated with a second processing environment that is accessible over a network connection from the first processing environment.

DETAILED DESCRIPTION

Figure 1:
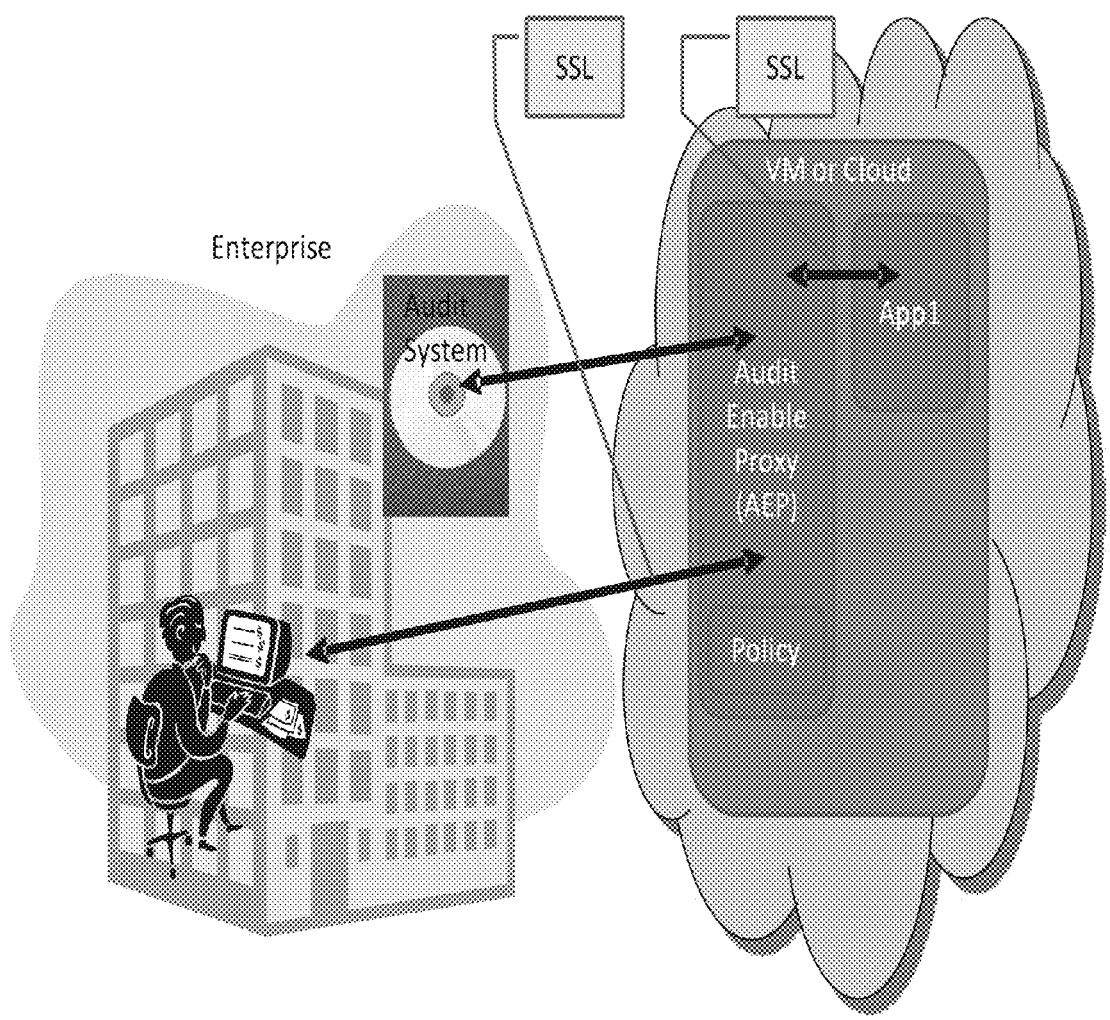
FIG. 1 is a diagram of an example architecture for auditing a network service, according to an example embodiment.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

It is also noted that a single resource can include other resources. For example, a machine resource can include a variety of hardware and software resources. A virtual machine (VM) is also a type of resource that logically represents a machine.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-5.

FIG. 1 is a diagram of an example architecture for auditing a cloud service, according to an example embodiment. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured and programmed (via the non-transitory computer-readable medium) to execute the components.

The architecture works by acting as a proxy that is placed between the users (one type of principal) and the application (may also be referred to herein as a "service"). It is also noted that the user depicted in the FIG. 1 can also be an automated process or application (another type of principal). All data that is sent to, and comes from the application passes though the proxy. This data can be in many different forms, some common examples are Hypertext Markup Language (HTML), Simple Object Access Protocol (SOAP), or Representational State Transfer (REST) protocol.

The "Audit Enabling Proxy" (AEP) receives requests that are meant for the application and can generate a transaction event. This transaction event can be used to start a policy action that may create an audit event, set a policy engine state, store a policy engine data variable, and/or store the event for later policy execution. Based on policy evaluation, the initial request may be allowed to flow to the application for processing or denied access to the application.

The application receives the request and processes it as it would normally. The application then sends the response back to the requester via the AEP. The application is not aware of the AEP and requires no changes to use it. Therefore, legacy applications can be used with the teachings presented herein and no changes need to be made to allow such legacy applications to benefit from the features of the AEP processing.

The AEP receives the response from the application and generates a transaction event. This transaction event can be used to start a policy action that may create an audit event, set a policy engine state, store a policy engine data variable, and/or store the event for later policy execution. Based on policy evaluation, the initial response may be allowed to flow from the application to the user or may be denied.

If the policy of the AEP requires that an audit event be sent, the AEP builds a audit event. This audit event can be made up of information stored in the AEP, such as: state, stored transaction events, and/or other known information. The audit event is digitally signed by the AEP to validate the AEP environment that is sending the audit event. The AEP may include a "Response Required" tag as part of the audit event based on policy evaluation. The audit event is then sent to the auditing system. If policy requires a response from the auditing system the proxy, then data flow for this thread is stopped until the response is received from the auditing system. This allows a guaranteed audit of an application and for an application that was previously not natively programmed for auditing capabilities. The AEP provides access control of the application based on policy and audibility. This can be use to control and audit both the requests and responses from and to the application.

When the audit system receives the audit event from the AEP and the "Response Required" flag is set in the audit event, the audit system builds a "Received Audit Event" response that identifies the incoming audit event and digitally signs the response to prove that the event has been received by the correct auditing system. This "Received Event" response is sent to the AEP.

The AEP receives the "Received Audit Event" and validates the signature. If the AEP had stopped the AEP process flow based on the audit event being handled, the AEP process flow is now re-enabled.

Figure 2:
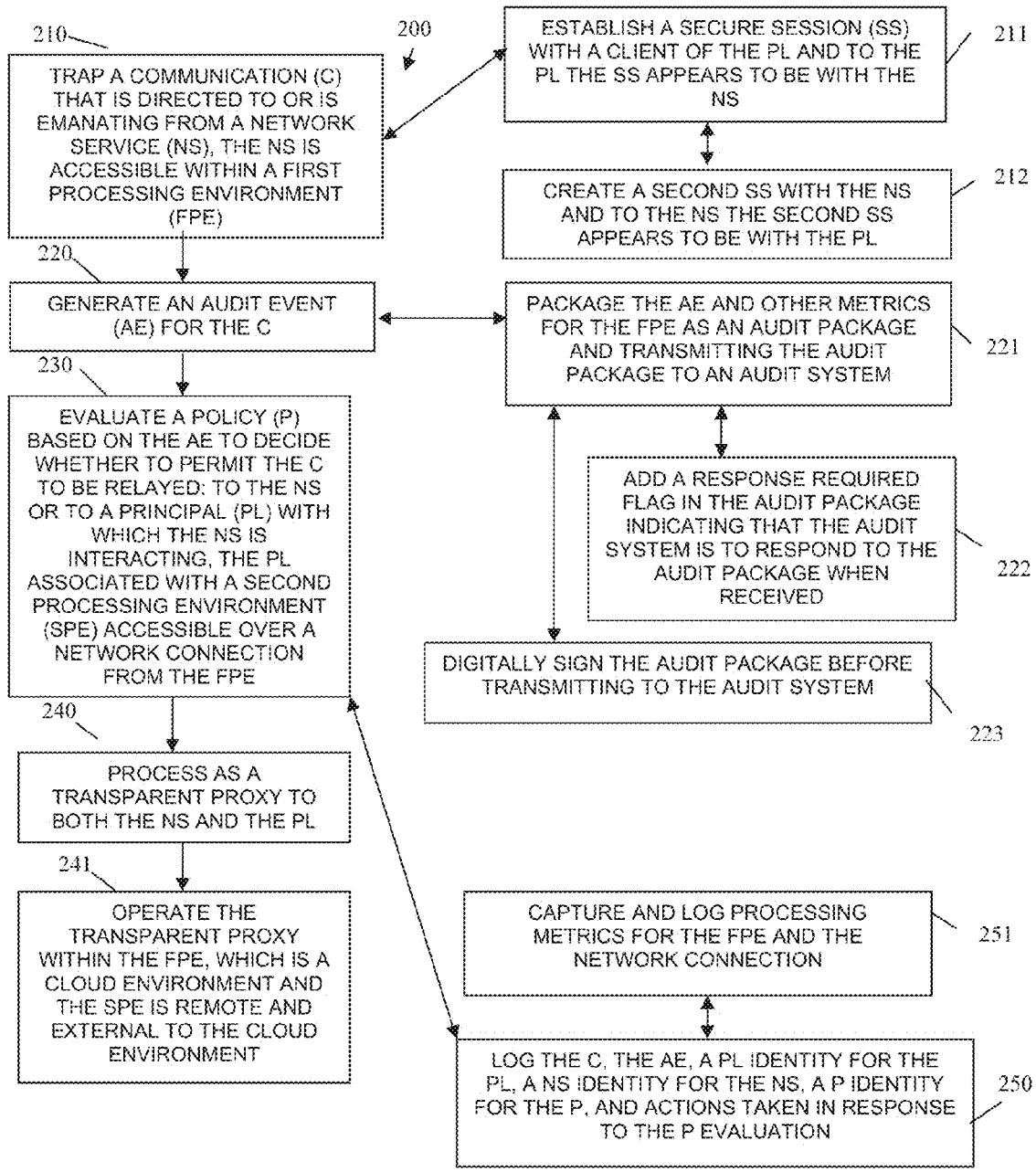
FIG. 2 is a diagram of a method for auditing a network service, according to an example embodiment.

FIG. 2 is a diagram of a method 200 for auditing a service, according to an example embodiment. The method (hereinafter "service auditor") is implemented, programmed, and resides in a non-transitory computer-readable storage medium for execution on one or more hardware processors of a network. The network may be wired, wireless, or a combination of wired and wireless.

In an embodiment, the service auditor implements, inter alia, the features of the FIG. 1 presented above.

According to an embodiment, the service auditor is implemented as a proxy within a cloud where the service auditor monitors all communication directed to a network service accessible within the cloud and all responses generated from that network service.

At 210, the service auditor traps a communication that is directed to or is emanating from a network service. The network service is accessible within a first processing environment. The communication originates from a principal in a second processing environment. The first processing environment can be a Virtual Machine (VM) environment or a cloud processing environment. The service auditor operates with the VM or the cloud along with the network service and is therefore capable of acting as a proxy within the VM or cloud. The communication is any electronic data being directed from the principal to the network service or any electronic data being directed from the network service to the principal.

According to an embodiment, at 211, the service auditor establishes a secure session (such as an SSL session) with a client of the principal and from the perspective of the principal the secure session appears to be occurring with the network service. In other words, the principal is entirely unaware of the processing associated with the service auditor.

Continuing with the embodiment of 211 and at 212, the service auditor creates a second secure session with the network service and from the perspective of the network service the second secure session appears to be occurring with the principal.

So, in the instances where the first processing environment is a cloud environment, dual SSL sessions can be created one between the principal and the service auditor and one between the service auditor and the network service. Traditionally, intra-cloud or even intra-VM communications do not have the ability to proceed as an SSL session. Therefore, this is an added level of security that heretofore has not occurred in the industry.

At 220, the service auditor generates an audit event for the communication. Examples of an audit event were presented above with respect to the FIG. 1. A variety of useful information can be included within the audit event or can be linked to the audit event, such as but not limited to: a calendar day, a time stamp, an identity of the principal, an identity of the network service, an identity of the first processing environment, an identity of the service auditor, processing metrics associated with the first processing environment, processing metrics associated with network connections, and others. In cases where the communication is in a HTML, REST, or SOAP format, the audit event may also include details about the command that is present in the communication (this is discussed in greater detail below with reference to the FIGS. 3 and 4).

According to an embodiment, at 221, the service auditor packages the audit event and other metrics for the first processing environment (such as, and by way of example only, processing load, number of processes running, memory load, details about cache load and efficiency, and the like) as an audit package of information. This audit package is then sent to an audit system. In some cases, the service auditor is configured to provide the audit package in a format that is expected by the audit system, so that the audit system can be an legacy enterprise audit system that requires no modification to interact with the service auditor.

Continuing with the embodiment of 221 and at 222, the service auditor adds a response required flag or command to the audit package or associates the response required flag or command with the communication that transmits the audit package to the audit system. This ensures that the audit system responds back to the service auditor when the audit package is received by the audit system. This is a mechanism to guarantee an audit of the communication even when the principal and the network service are not natively programmed for providing audit features.

Continuing with the embodiment of 221 and at 223, the service auditor digitally signs the audit package before transmitting the audit system. This can be used to ensure secure communications between the audit system and the service auditor. The communication between the audit system and the service auditor can also occur over a secure communication channel, such as via an SSL session.

At 230, the service auditor evaluates a policy based on the audit event to decide whether to permit the communication to be relayed: to the network service (in the case where the communication is being originally sent from the principal to the network service) and to the principal (in the case where the communication is being originated from the network service). The principal access the first processing environment via a network connection. It is noted (although not specifically shown in FIG. 2) that if the policy is not successfully evaluated then the communication is no related to the target entity; in such a situation a variety of error messages can be configured to be provided to the originating entity of the communication.

In an embodiment, at 240, the service auditor processes as a transparent proxy to the principal and/or at the same time processes as a reverse proxy for the network service. So, the network service and the principal do not require any pre-configuration or any modifications to interact with the service auditor.

Continuing with the embodiment at 240 and at 241, the service auditor operates the transparent and/or reverse proxy within the first processing environment (such as the AEP described above with the FIG. 1). The first processing environment is also a cloud environment and the second processing environment of the principal is remote and external to the cloud environment.

In another scenario, at 250, the service auditor logs the communication, the audit event, a principal identity for the principal, a network service identity for the network service, and any actions taken in response to the principal evaluation.

Continuing with the embodiment of 250 and at 251, the service auditor captures and logs processing metrics for the first processing environment and the network connection. So, a detailed log can be indexed in a repository for later creation of profiles associated with the communication, the network service, and the first processing environment relationship.

Figure 3:
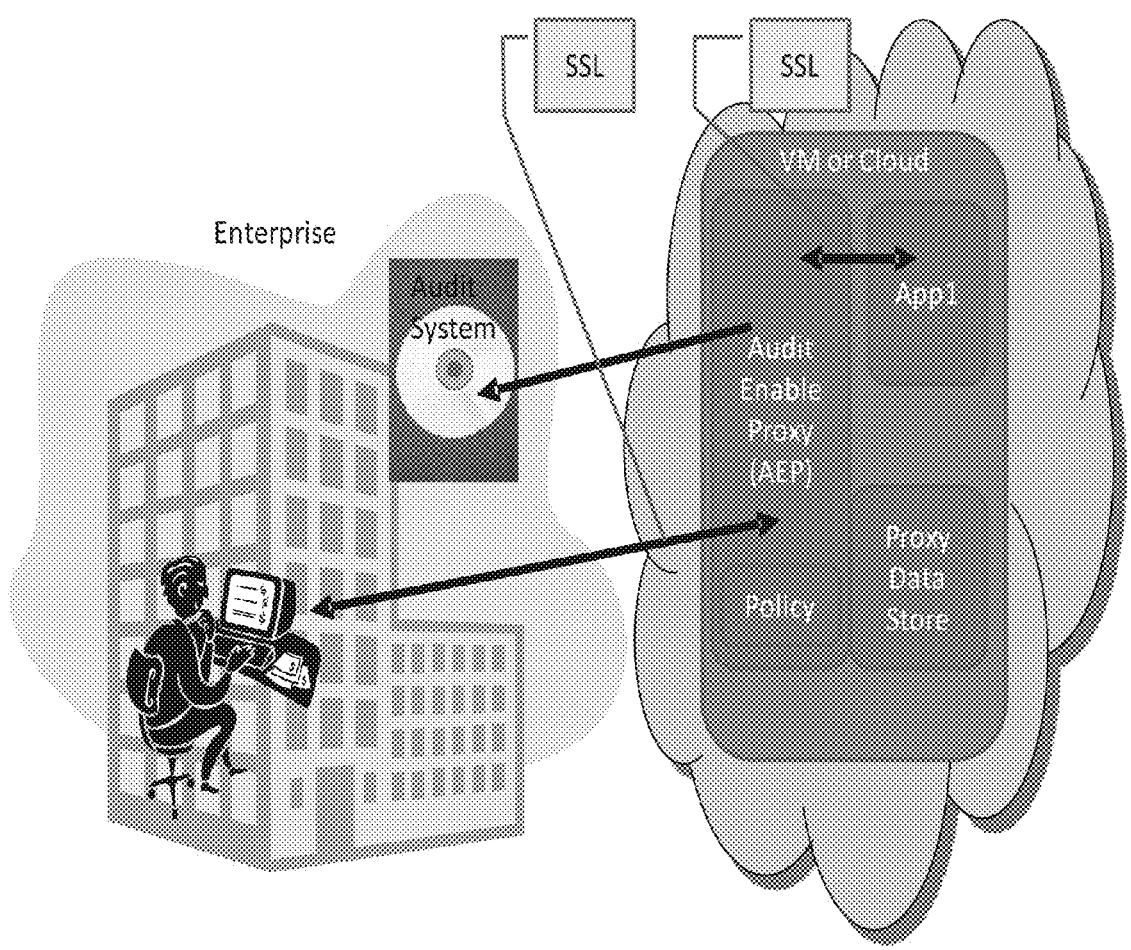
FIG. 3 is a diagram of an example architecture for controlling a network service, according to an example embodiment.

FIG. 3 is a diagram of an example architecture for controlling a cloud service, according to an example embodiment. Again, this is being presented for purposes of illustration only as other configurations can be used as well and still benefit from the techniques presented herein above and below.

Again, the architecture in the FIG. 2 works by acting as a proxy that is placed between the users and the application the same as what was discussed above with reference to the FIG. 1. The AEP can understand the "verb and noun" or command syntax of many different forms; some common examples are HTML, SOAP, or REST.

The "Audit Enabling Proxy" (AEP) receives requests that are meant for the application and generates transaction events that are aware of the command that is being requested. For example, in REST this may be the "verb" (GET, PUT . . . ) and the "noun" ( . . . /timecard/change . . . ). If the connection requires Transport Layer Security (TLS) and/or Secure Sockets Layer (SSL) the proxy "SSLizes" the connection by becoming the SSL endpoint for the user (again one type of principal can be an automated application as well) and then builds a new SSL connection to the application. This allows a secure session from user to the application and allows the proxy to view the content of the data sent and received.

This transaction event now includes the details of the "cause event" and can be used to start a policy action that may create an audit event, set a policy engine state, store a policy engine data variable, and/or store the event for later policy execution as stated above. This "cause event" will also update a proxy data store with the "command" (verb/noun pair in REST), "time stamp," "destination server," and other available information about the request. The proxy now executes policy to determine if the request should be allowed to go to the application as show above. In addition, the proxy policy uses previously acquired data in the proxy data store to determine access control permissions.

The application receives the request and processes it as it would normally. The application then sends the response back to the requester via the AEP. Again, the application is not aware of the AEP and the application requires no changes to use the AEP.

The AEP receives the response from the application and generates a transaction event as described above. This transaction event is paired with the "Cause Event" stored in the proxy data store and builds an "Effect Event." The "Effect Event" contains information about the time between the "Cause" and "Effect" events, any errors from the "Cause" or "Effect" event, the command(s) in the "Cause Event" that caused this "Effect Event," and any other data that can be collected from the relationships between the "Cause" and "Event" events.

As the architecture is used over time "Cause and Effect" profiles can be used to allow or deny access to the application by the AEP. The access control of AEP can be based on a single or a group of application commands, and the effect that those commands have had in the past. This allow a system administrator to disable specific REST, SOAP or HTML commands based on past or current performance of the system. The system may include policy that limits access to heavy workload commands or functions if the performance of the system is slowing down. This may be used to scale a system of commands at a particular time and keep the basic functionality of the system up when high workloads are being processed.

Policy on the AEP may include, by way of example only, statements, such as:

"If the average "Effect Response Time" over the last 2 minutes for "This Command" is greater than 10 seconds "Deny" access and "Redirect" to the busy icon."

or

"If the average "Effect Response Time" over the last 2 minutes for "All Commands" is greater than 2 seconds "Deny" access to "REST GET . . . /new/ . . . " and Return "REST_Busy"

The above provided examples were presented for purposes of illustration only as it is readily apparent that other situations and policy can be used with the teachings provided herein above and below.

The techniques presented herein above and below allow for some novel features and capabilities, such as but not limited to:

using a proxy to intercept incoming and outgoing events for the purpose of auditing an application/service with any modification of the application/service;
 using a SSLizing proxy to audit, monitor, and control the application/service, which is using SSL/TLS security, at a command or message level and without modifying the application/service;
 using a proxy server in a cloud or VM environment to audit, and control applications/services;
 providing guarantied audit events without changes to the application/service being audited;
 providing command or function granular audit events without changes to the application/service being audited; this can be done even if the application/service uses SSL or TLS;
 protecting external or cloud applications/services, from unknown use, from hackers or administers; and
 controlling access to a application/service at a command or function level based on past performance of that command or other commands.

Figure 4:
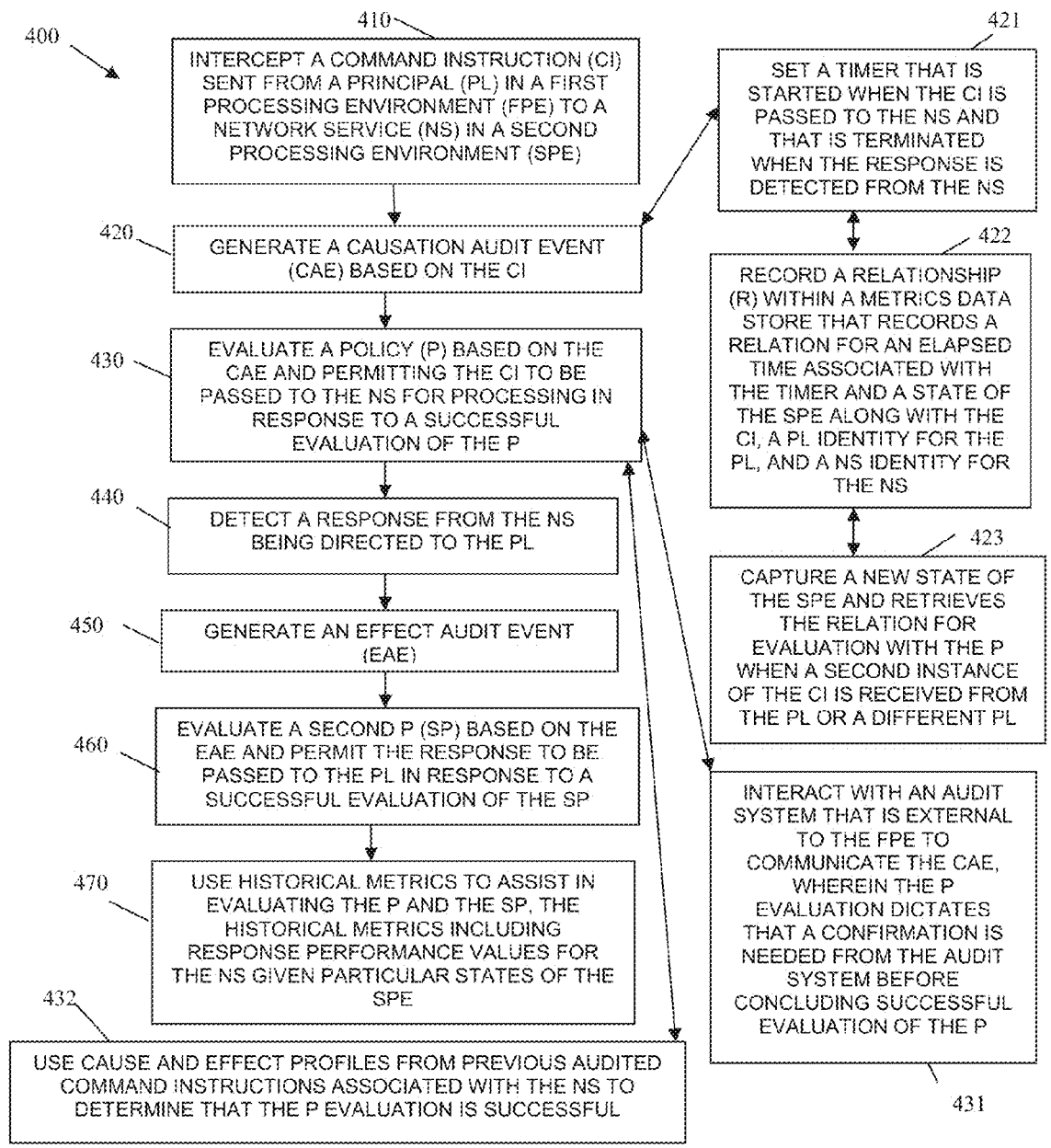
FIG. 4 is a diagram of a method for controlling a network service, according to an example embodiment.

FIG. 4 is a diagram of a method 400 for controlling a network service, according to an example embodiment. The method 400 (hereinafter "service controller") is implemented, programmed, and resides within a non-transitory computer-readable or processor-readable medium that executes on one or more hardware processors of a network. Moreover, the service controller is operational over a network and the network may be wired, wireless, or a combination of wired and wireless.

Example aspects of the service controller were presented above with discussion of the FIG. 3.

At 410, the service controller intercepts a command instruction sent from a principal in a first processing environment to a network service located in a second processing environment (such as a VM or a cloud). Again, the principal and the network service are unaware of and not pre-configured to interact with the service controller. So, the service controller acts as a transparent proxy located within the second processing environment from the perspective of the principal and simultaneously acts as a reverse proxy from the perspective of the network service.

At 420, the service controller generates a causation audit event based on the command instruction. That is, the service controller identifies the type of command or operation being sent from the principal to the network service. This can occur for a variety of protocols used by the principal and network service to communicate with one another that take on a standard format, such as REST, SOAP, HTML, eXtensible Markup Language (XML), and the like.

According to an embodiment, at 421, the service controller set a timer that is stated when the command instruction is passed to the network service and that is terminated when a response is detected from the network service.

Continuing with the embodiment of 421 and at 422, the service controller records a relationship within a metrics data store that records a relation for an elapsed time associated with the timer and a state of the second processing environment along with the command instruction, a principal identity for the principal, and a network service identity for the network service.

Continuing with the embodiment of 422 and at 423, the service controller captures a new state of the second processing environment and retrieves the relation for evaluation of the policy (discussed below at 430) when a second instance of the command instruction is received from the principal or a different principal. In other words, past performance of the second processing environment and the network service in handling a particular command instruction can be used to determine what action to take with a new instance of the same command instruction.

At 430, the service controller evaluates a policy based on the causation audit event and permits the command instruction to be passed onto the network service for processing in response to or based on a successful evaluation of the principal.

In an embodiment, at 431, the service controller interacts with an audit system that is external to the first processing environment to communicate the causation audit event. The policy evaluation dictates that a confirmation is needed from the audit system before concluding successful evaluation of the policy. This ensures a guarantee audit of the command instruction.

Continuing with the embodiment of 431 and at 432, the service controller uses cause and effect profiles from previously audited command instructions associated with the network service to determine that the policy evaluation is successful.

At 440, the service controller detects a response from the network service being directed from the network service to the principal.

At 450, the service controller generates an effect audit event. And, at 460, the service controller evaluates a second policy based on the effect audit event and permits the response to be passed onto the principal in response to or based on a successful evaluation of the second policy.

According to an embodiment, at 460, the service controller uses historical metrics to assist in evaluating the policy and the second policy. The historical metrics include response performance values for the network service given particular states of the second processing environment.

Figure 5:
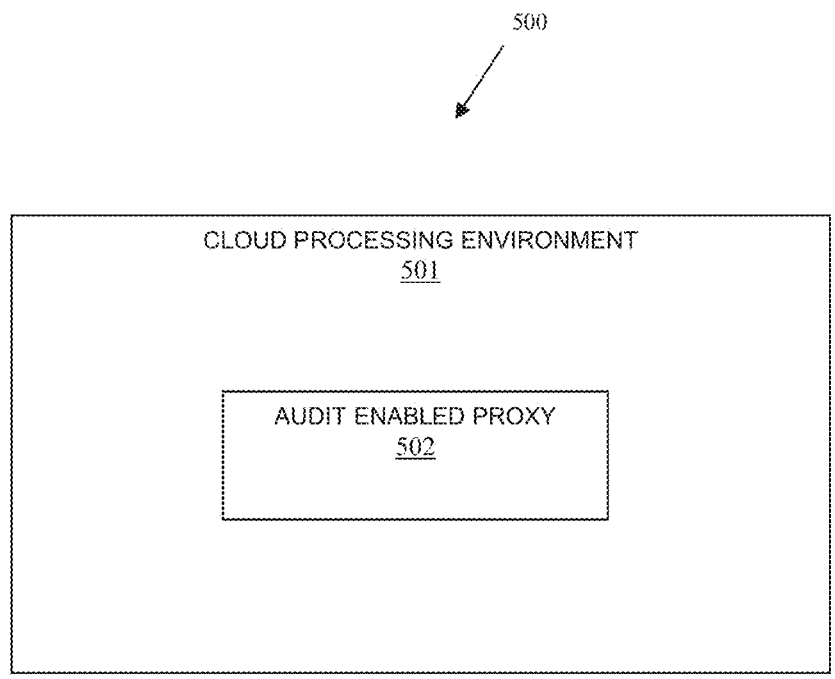
FIG. 5 is a diagram of a network auditing control system, according to an example embodiment.

FIG. 5 is a diagram of a network auditing control system 500, according to an example embodiment. The components of the network auditing control system 500 are implemented, programmed, and reside within a non-transitory and computer or processor-readable storage medium for purposes of executing on one or more hardware processors of a network. The network may be wired, wireless, or a combination of wired and wireless.

The network auditing control system 500 implements, inter alia, various aspects of the FIGS. 1-4.

The network auditing control system 500 includes a cloud processing environment 501 and an audit enabled proxy 502. Each of these components and their interactions with one another will now be discussed in detail.

The cloud processing environment 501 includes a variety of machines, devices, and software resources that are logically organized as a single processing environment.

The audit-enabled proxy 502 is implemented and programmed within a non-transitory computer-readable storage medium for execution on one or more machines of the cloud processing environment 501. Example aspects of the audit-enabled proxy 502 were discussed above with reference to the FIGS. 1-4.

The audit-enabled proxy 502 is configured to intercept inter-cloud communications being directed to a network service that resides in the cloud processing environment 501. Furthermore, the audit-enabled proxy 502 is also configured to intercept intra-cloud responses emanating from the network service that are being directed to principals. The audit-enabled proxy 502 is additionally configured to generate audit events based on each of the inter-cloud communications and the intra-cloud responses. The audit-enabled proxy 502 evaluates policies based on the audit events and decisions are made based on the evaluation of the policies as to whether to permit the inter-cloud communications to be received by the network service and as to whether to permit the intra-cloud responses to be sent to the principals.

According to an embodiment, the audit-enabled proxy 502 is a transparent proxy for the principals and simultaneously acts as a reverse proxy for the network service, where the network service is a legacy and unmodified service, meaning the network service is not pre-configured or modified in any manner to interact with the audit-enabled proxy 502.

In another case, the inter-cloud communications and the intra-cloud responses are in a format for REST, HTML, SOAP, or XML.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
monitoring, via a proxy, an interaction between a principal and a remote network resource, wherein monitoring further includes suspending the interaction for occurring between the principal and the remote resource until the policy can be evaluated;
assigning, at the proxy, an audit event that is linked to the interaction; and
evaluating, at the proxy, a policy based on the audit event that determines an action to take by the proxy with respect to the interaction, wherein evaluating further includes preventing the interaction when the policy evaluation dictates, wherein evaluating further includes passing the interaction through to the remote network resource when the policy evaluation permits, wherein passing further includes establishing a first secure session with the principal, which appears to the principal to be a connection to the remote network service, wherein establishing further includes creating a second secure session with the remote network service, which appears to the remote network service to be a connection to the principal; and
monitoring subsequent transactions between the principal over the first secure session and the remote network service over the second secure session, wherein monitoring further includes evaluating one or more additional policy conditions during each transaction, and wherein evaluating further includes denying a number of the transactions based on evaluation of the policy conditions and passing a number of the transactions from and to die first secure session to and from the second secure session based on evaluation of the policy conditions.

* * * * *

UNITED STATES PATENT AND TRADEMARK OFFICE
CERTIFICATE OF CORRECTION

Page 1 of 1

PATENT NO.         : 9,088,480 B2
APPLICATION NO.    : 14/076895
DATED              : July 21, 2015
INVENTOR(S)        : Burch et al.

It is certified that error appears in the above-identified patent and that said Letters Patent is hereby corrected as shown below:

In the Claims

Column 10, line 38, Claim 1, delete "die" and insert --the--, therefor

Signed and Sealed this
Twelfth Day of January, 2016

Michelle K. Lee
*Director of the United States Patent and Trademark Office*